(12) United States Patent
Tsunoda et al.

(10) Patent No.: US 10,339,028 B2
(45) Date of Patent: Jul. 2, 2019

(54) LOG STORAGE VIA APPLICATION PRIORITY LEVEL

(71) Applicant: FUJITSU LIMITED, Kawasaki-shi, Kanagawa (JP)

(72) Inventors: Tadanobu Tsunoda, Yokohama (JP); Naoki Nishiguchi, Kawasaki (JP); Akira Fujii, Machida (JP); Tatsuro Matsumoto, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 9 days.

(21) Appl. No.: 15/363,856

(22) Filed: Nov. 29, 2016

(65) Prior Publication Data

US 2017/0153960 A1 Jun. 1, 2017

(30) Foreign Application Priority Data

Dec. 1, 2015 (JP) ................. 2015-234753

(51) Int. Cl.
  *G06F 11/34* (2006.01)
  *G06F 11/30* (2006.01)
  *G06F 17/40* (2006.01)

(52) U.S. Cl.
  CPC ........ *G06F 11/3476* (2013.01); *G06F 11/302* (2013.01); *G06F 11/3003* (2013.01); *G06F 11/3072* (2013.01); *G06F 17/40* (2013.01); *G06F 11/3438* (2013.01); *G06F 2201/865* (2013.01)

(58) Field of Classification Search
  CPC ............. G06F 11/3409; G06F 11/3438; G06F 11/3476
  See application file for complete search history.

(56) References Cited

U.S. PATENT DOCUMENTS

| | | | | |
|---|---|---|---|---|
| 7,055,137 | B2 * | 5/2006 | Mathews | G06F 11/3688 714/46 |
| 8,630,525 | B2 * | 1/2014 | Steelberg | G06Q 30/0601 386/200 |
| 8,856,331 | B2 * | 10/2014 | Coyer | H04L 29/06027 709/226 |
| 9,176,803 | B2 * | 11/2015 | Biberdorf | G06F 11/0709 |

(Continued)

FOREIGN PATENT DOCUMENTS

| | | |
|---|---|---|
| JP | 5-210542 | 8/1993 |
| JP | 2006-277115 A | 10/2006 |

(Continued)

OTHER PUBLICATIONS

EESR—Extended European Search Report dated Mar. 30, 2017 corresponding to European Patent Application No. 16201165.4. ** JP2013-045313 cited in EESR was previously submitted in the IDS filed on Nov. 29, 2016.

(Continued)

*Primary Examiner* — Joseph R Kudirka
(74) *Attorney, Agent, or Firm* — Fujitsu Patent Center

(57) ABSTRACT

An information processing device includes a memory and a processor coupled to the memory and configured to determine a priority level of an application that provides a service depending on a predetermined state, using relation information between the predetermined states, and control storing log of the application in the memory, depending on the priority level of the application.

8 Claims, 23 Drawing Sheets

(56) References Cited

U.S. PATENT DOCUMENTS

| | | | |
|---|---|---|---|
| 9,405,665 B1* | 8/2016 | Shashi | G06F 11/3688 |
| 2007/0261030 A1* | 11/2007 | Wadhwa | G06F 11/3476 |
| | | | 717/127 |
| 2008/0228937 A1 | 9/2008 | Araumi | |
| 2008/0248801 A1* | 10/2008 | Fletcher | H04W 4/02 |
| | | | 455/435.2 |
| 2009/0204645 A1 | 8/2009 | Machida et al. | |
| 2011/0153615 A1* | 6/2011 | Mizuguchi | G06F 17/30705 |
| | | | 707/740 |
| 2012/0047509 A1* | 2/2012 | Ben-Itzhak | G06F 9/50 |
| | | | 718/103 |
| 2013/0042230 A1* | 2/2013 | Little | G06F 8/65 |
| | | | 717/173 |
| 2015/0143182 A1 | 5/2015 | Rajamanickam et al. | |

FOREIGN PATENT DOCUMENTS

| | | |
|---|---|---|
| JP | 2007-249373 A | 9/2007 |
| JP | 2008-071085 A | 3/2008 |
| JP | 2013-003950 A | 1/2013 |
| JP | 2013-045313 A | 3/2013 |
| JP | 2015-200959 | 11/2015 |

OTHER PUBLICATIONS

EPOA—European Office Action dated Sep. 8, 2018 for corresponding European Patent Application No. 16201165.4. ** US2015/0143182A1 cited in the EPOA was previously submitted in the IDS filed on Jun. 16, 2017.

Ichiro Mizunuma et al., "A Design Method for Stand-by-Redundant Systems Guaranteeing Timing Constaints", the Transactions of the Institute of Electronics, Information and Communication Engineers, Aug. 25, 1995, vol. J78-D-I, No. 8, pp. 756-769. Cited in JP-OA dated May 14, 2019 corresponding Japanese Application No. 2015-234753.

JPOA—Office Action of Japanese patent application No. 2015-234753 dated May 14, 2019 with Machine translation.

* cited by examiner

FIG. 5

| PLACE ID | PLACE DEFINITION | PARENT PLACE ID | APP ID |
|---|---|---|---|
| SCHOOL PLACE | ... | – | ATTENDANCE AND ABSENCE CHECKING APP |
| SCIENCE ROOM PLACE | ... | SCHOOL PLACE | SCIENCE TEXTBOOK APP |
| GROUP A PLACE | ... | SCIENCE ROOM PLACE | GROUP LEARNING APP |
| GROUP B PLACE | ... | SCIENCE ROOM PLACE | GROUP LEARNING APP |
| MUSIC ROOM PLACE | ... | SCHOOL PLACE | MUSIC TEXTBOOK APP, MUSIC PERFORMANCE APP |
| GROUP C PLACE | ... | MUSIC ROOM PLACE | GROUP MUSIC PERFORMANCE APP |

FIG. 6

| APP ID | PLACE ID |
|---|---|
| ATTENDANCE AND ABSENCE CHECKING APP | TERMINAL 1, TERMINAL 2, TERMINAL 3, ··· |
| SCIENCE TEXTBOOK APP | TERMINAL 1, TERMINAL 2, ··· |
| MUSIC TEXTBOOK APP | TERMINAL 3, ··· |
| MUSIC PERFORMANCE APP | – |
| GROUP LEARNING APP | TERMINAL 1, TERMINAL 2, ··· |
| GROUP MUSIC PERFORMANCE APP | – |
| | |

| APP ID | APP DEPTH |
|---|---|
| ATTENDANCE AND ABSENCE CHECKING APP | 1 |
| SCIENCE TEXTBOOK APP | 2 |
| MUSIC TEXTBOOK APP | 2 |
| MUSIC PERFORMANCE APP | 2 |
| GROUP LEARNING APP | 3 |
| GROUP MUSIC PERFORMANCE APP | 3 |

FIG. 9

| APP ID | AVERAGE LOG OUTPUT AMOUNT |
|---|---|
| ATTENDANCE AND ABSENCE CHECKING APP | $a_1$ |
| SCIENCE TEXTBOOK APP | $a_2$ |
| MUSIC TEXTBOOK APP | $a_3$ |
| MUSIC PERFORMANCE APP | $a_4$ |
| GROUP LEARNING APP | $a_5$ |
| GROUP MUSIC PERFORMANCE APP | $a_6$ |

FIG. 12

| PRIORITY LEVEL | APP ID |
|---|---|
| 1 | GROUP LEARNING APP |
| 2 | SCIENCE TEXTBOOK APP |
| 3 | MUSIC TEXTBOOK APP |
| 4 | ATTENDANCE AND ABSENCE CHECKING APP |

| APP ID | AVERAGE LOG OUTPUT AMOUNT |
|---|---|
| ATTENDANCE AND ABSENCE CHECKING APP | $a_1$ |
| SCIENCE TEXTBOOK APP | $a_2$ |
| MUSIC TEXTBOOK APP | $a_3$ |
| MUSIC PERFORMANCE APP | $a_4$ |
| GROUP LEARNING APP | $a_5$ |
| GROUP MUSIC PERFORMANCE APP | $a_6$ |
| ... | ... |
| MODULE 1 | $b_1$ |
| MODULE 1 | $b_2$ |
| MODULE 1 | $b_3$ |

| APP ID | DEPENDENCY MODULE ID |
|---|---|
| GROUP LEARNING APP | MODULE 1, MODULE 2 |
| SCIENCE TEXTBOOK APP | MODULE 1, MODULE 3 |
| MUSIC TEXTBOOK APP | MODULE 1 |
| ATTENDANCE AND ABSENCE CHECKING APP | MODULE 1, MODULE 4 |

407

LOG STORAGE VIA APPLICATION PRIORITY LEVEL

CROSS-REFERENCE TO RELATED APPLICATION

This application is based upon and claims the benefit of priority of the prior Japanese Patent Application No. 2015-234753, filed on Dec. 1, 2015, the entire contents of which are incorporated herein by reference.

FIELD

The embodiments discussed herein are related to an information processing device and an information processing method.

BACKGROUND

In a program such as an application, log information such as an operation log and an access log is acquired. There have been known techniques in which the priority level of each of the programs is determined in acquiring log information, using a dependency relation between programs.

CITATION LIST

Patent Documents

[PATENT DOCUMENT 1] Japanese Laid-open Patent Publication No. 2013-003950
[PATENT DOCUMENT 2] Japanese Laid-open Patent Publication No. 2006-277115
[PATENT DOCUMENT 3] Japanese Laid-open Patent Publication No. 2013-045313

SUMMARY

According to an aspect of the invention, an information processing device includes a memory and a processor coupled to the memory and configured to determine a priority level of an application that provides a service depending on a predetermined state, using relation information between the predetermined states, and control storing log of the application in the memory, depending on the priority level of the application.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a table illustrating an example of a place management table;
FIG. 6 is a table illustrating an example of an app use terminal table;
FIG. 7 is a table illustrating an example of an app depth table;
FIG. 9 is a table illustrating an example of an average output amount table;
FIG. 12 is a table illustrating an example of an app priority level table;
FIG. 20 is a table illustrating another example of the average output amount table;
FIG. 22 is a table illustrating an example of a dependency relation table.

DESCRIPTION OF EMBODIMENTS

In the case that a service is provided by an application, log information of the essential application for the service is required to grasp the usage of the service. However, by the known technique cited above, enough log information of the essential application for the service cannot be acquired.

That is, for example, by the known technique cited above, even if there is a dependency relation between some applications, the log information of the essential applications for the service is not always acquired if there is not a dependency relation between the essential applications.

According to one aspect, it is an object of the present disclosure to acquire log information of an application used for providing a service.

Embodiments of the present disclosure will be described below with reference to the accompanying drawings.

First Embodiment

Figure 1:
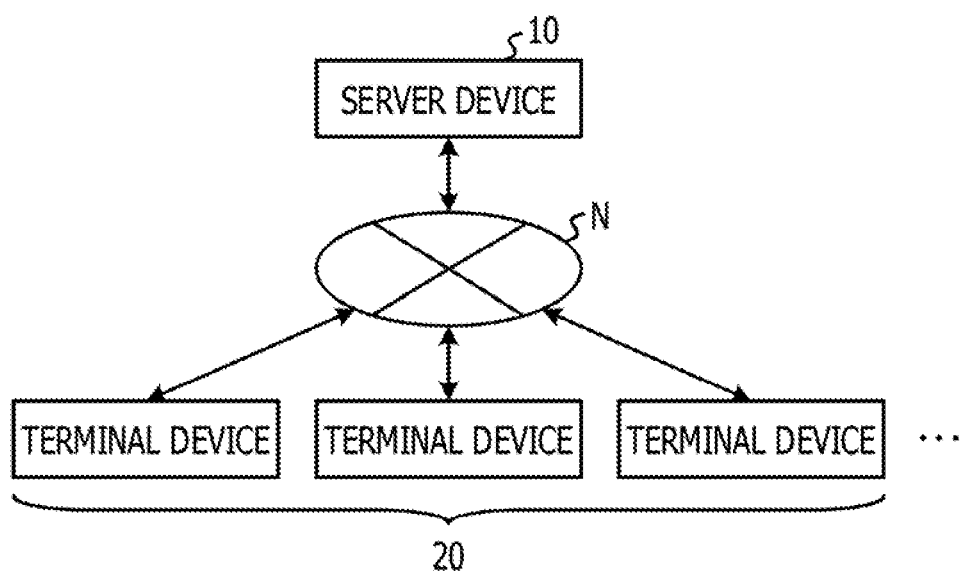
FIG. 1 is a diagram illustrating an example of a system configuration of an app distribution system according to a first embodiment.

First, a system configuration of an app distribution system 1 according to this embodiment will be described with reference to FIG. 1. FIG. 1 is a diagram illustrating an example of a system configuration of an app distribution system according to a first embodiment.

The app distribution system 1 according to this embodiment includes a server device 10 and one or more terminal devices 20. Also, the server device 10 is coupled to the terminal devices 20, for example, via a network N, such as the Internet, a telephone network, and so on, so as to be able to communicate with one another.

The server device 10 is an information processing device that distributes an application (which will be hereinafter also referred to as an "app") to the terminal devices 20. When any one of the terminal devices 20 is in a specific state called "place", with this as a trigger, the server device 10 distributes an app assigned to the place to the terminal device 20, As described above, the server device 10 according to this embodiment distributes an app assigned to a place, and thereby, provides the terminal device 20 with a service that is realized by the app. Thus, the server device 10 according to this embodiment can provide the terminal device 20 with a service matching a specific state (place) of the terminal device 20.

Examples f the place include a state indicating that the terminal device 20 entered a specific place (that is, a specific area), which can be physically defined, and a state indicating that the terminal device 20 was classified into a specific set, which is logically defined.

Examples of the place indicating that the terminal device 20 entered a specific physically defined place include "SCHOOL PLACE", which indicates that the terminal device 20 entered a school building, and "SCIENCE ROOM PLACE", which indicates that the terminal device 20 entered a science room of a school. Also, examples of the place indicating that the terminal device 20 was classified into a specific logically defined set include "GROUP A PLACE", which indicates that the terminal device 20 was classified into "GROUP A" of experiment groups in a science class. Note that the terminal device 20's being in a specific state (place) (that is, the terminal device 20's entering a specific place or is classified into a specific set) will be also referred to as "checking in".

In addition, note that examples of the place indicating that the terminal device 20 was classified into a specific logically defined set include "PERSONNEL DEPARTMENT PLACE", which indicates that the terminal device 20 was classified into a specific department (for example, a personnel department) in a company, and "HIRING TEAM PLACE" indicating that indicates that the terminal device 20 was classified into a specific team (for example, a hiring team).

Also, the server device 10 collects log information, such as an operation log, an access log, and so on, of an app (that is, an app used by the terminal device 20) distributed to the terminal device 20. In collecting the log information, the server device 10 determines, based on a place, the priority level of each app for which the log information is collected.

As described above, the server device 10 according to this embodiment collects the log information in accordance with the priority level based on the place, and thereby, acquires the log information using a relation between places where a service is provided.

The terminal device 20 is a portable information processing device, such as a smartphone, a tablet terminal, and so on. The terminal device 20 transmits, when the terminal device 20 checks in, for example, position information of the terminal device 20 to the server device 10. Thus, an app assigned to a place in which the terminal device 20 checked is distributed to the terminal device 20 from the server device 10.

Figure 2:
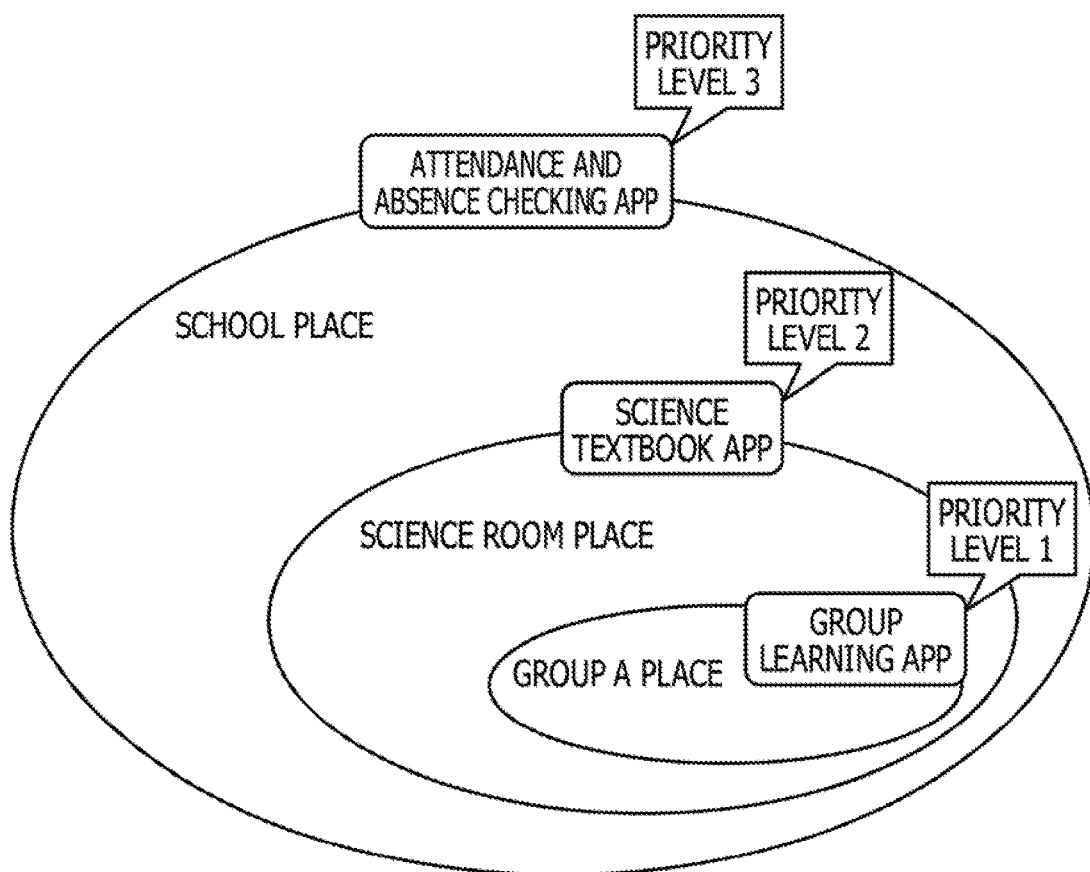
FIG. 2 is a diagram illustrating an outline of determination of priority level.

An outline of a case where, in the app distribution system 1 according to this embodiment, the priority level of each app for which the log information is collected is determined based on the place will be described below with reference to FIG. 2. FIG. 2 is a diagram illustrating an outline of determination of priority level.

In FIG. 2, it is indicated that, when the terminal device 20 checks in "SCHOOL PLACE", "ATTENDANCE AND ABSENCE CHECKING APP" is distributed to the terminal device 20 by the server device 10. Similarly, it is also indicated that, when the terminal device 20 checks in "SCIENCE ROOM PLACE", "SCIENCE TEXTBOOK APP" is distributed to the terminal device 20 by the server device 10. Similar applies to "GROUP A PLACE".

In this case, as illustrated in FIG. 2, for example, when there is a inclusion relation (a parent and child relation) between places, the priority level of an app that is distributed in an included place (a child place) is set higher than the priority level of an app that is distributed in a place (a parent place) that includes the child place. That is, as illustrated in FIG. 2, the priority level of "GROUP LEARNING APP" that is distributed in "GROUP A PLACE" (a child place) is set higher than the priority level of "SCIENCE TEXTBOOK APP" that is distributed in "SCIENCE ROOM PLACE" (a parent place).

Similarly, the priority level of "SCIENCE TEXTBOOK APP" that is distributed in "SCIENCE ROOM PLACE" (a child place) is set higher than the priority level of "ATTENDANCE AND ABSENCE CHECKING APP" that is distributed in "SCHOOL PLACE" (a parent place).

As described above, in the app distribution system 1 according to this embodiment, if there is a parent and child relation between places, the priority level of an app that is distributed in each of the places is determined in accordance with the parent and child relation between the places. Thus, in the app distribution system 1 according to this embodiment, the priority level of each app for acquiring log information can be determined in accordance with a relation between places of a service.

Figure 3:
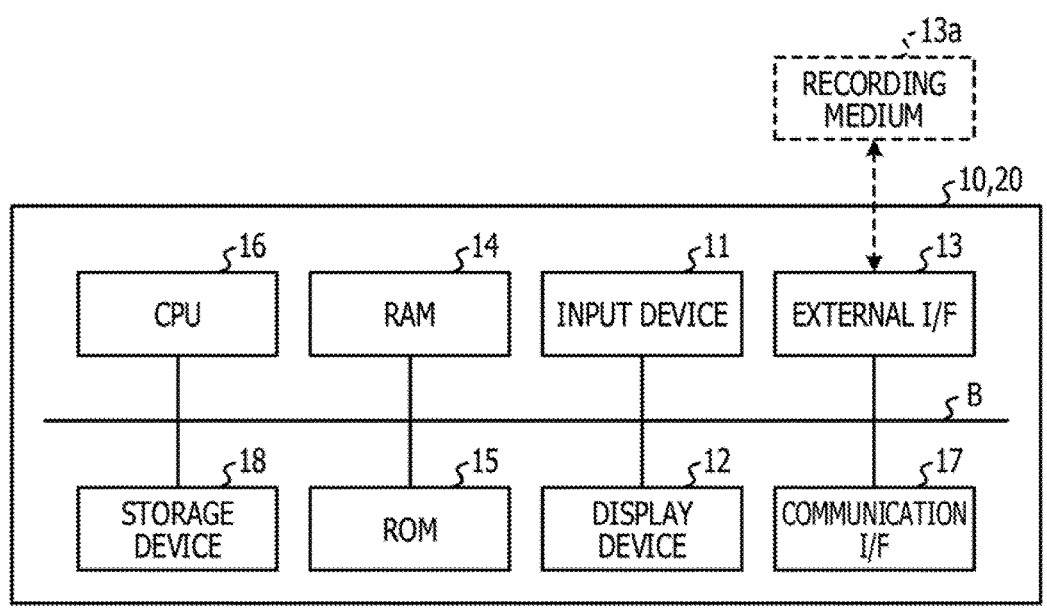
FIG. 3 is a diagram illustrating an example of a hardware configuration of a server device and a terminal device according to the first embodiment.

Next, a hardware configuration of the server device 10 and the terminal devices 20 according to this embodiment will be described with reference to FIG. 3. FIG. 3 is a diagram illustrating an example of a hardware configuration of a server device and a terminal device according to the first embodiment. Note that each of the server device 10 and the terminal devices 20 has a similar hardware configuration, and therefore, a hardware configuration of the server device 10 will be mainly described below.

The server device 10 includes an input device 11, a display device 12, an external unit I/F 13, a random access memory (RAM) 14, a read only memory (ROM) 15, a central processing unit (CPU) 16, a communication I/F 17, and a storage device 18. The hardware devices described above are mutually coupled to one another via a bus B.

The input device 11 is a keyboard, a mouse, a touch panel, and so on, and is used for inputting operation signals of various types to the server device 10. The display device 12 displays various results of processing. Note that in an embodiment the server device 10 may be configured in which the input device 11 and/or the display device 12 are coupled to the bus B when they are needed.

The external unit I/F 13 is an interface with an external device. Examples of the external device include a recording medium 13a. Thus, the server device 10 can read and/or write the recording medium 13a via the external unit I/F 13.

Note that examples of the recording medium 13a include, for example, a SD memory card, USB memory, a compact disk (CD), a digital versatile disk (DVD), and so on.

The RAM 14 is volatile semiconductor memory that temporarily stores a program and data. The ROM 15 is nonvolatile semiconductor memory that can hold data even after power is off. The CPU 16 is an arithmetic device that reads a program or data from the storage device 18, the ROM 15, and so on, onto the RAM 14 and executes various types of processing, The communication I/F 17 is an interface used for coupling the server device 10 to the network N. Thus, the server device 10 can communicate with the terminal devices 20.

The storage device 18 is nonvolatile memory that stores a program and data. Examples of the program and data that are stored in the storage device 18 include a program that realizes this embodiment, an operating system (OS) that is a basic software, various types of applications.

Note that each of the terminal devices 20 may include a global positioning system (GPS) receiver, which acquires position information of the terminal device 20.

Each of the server device 10 and the terminal devices 20 according to this embodiment has the hardware configuration illustrated in FIG. 3, and thereby, various types of processing, which will be described later, are realized.

Figure 4:
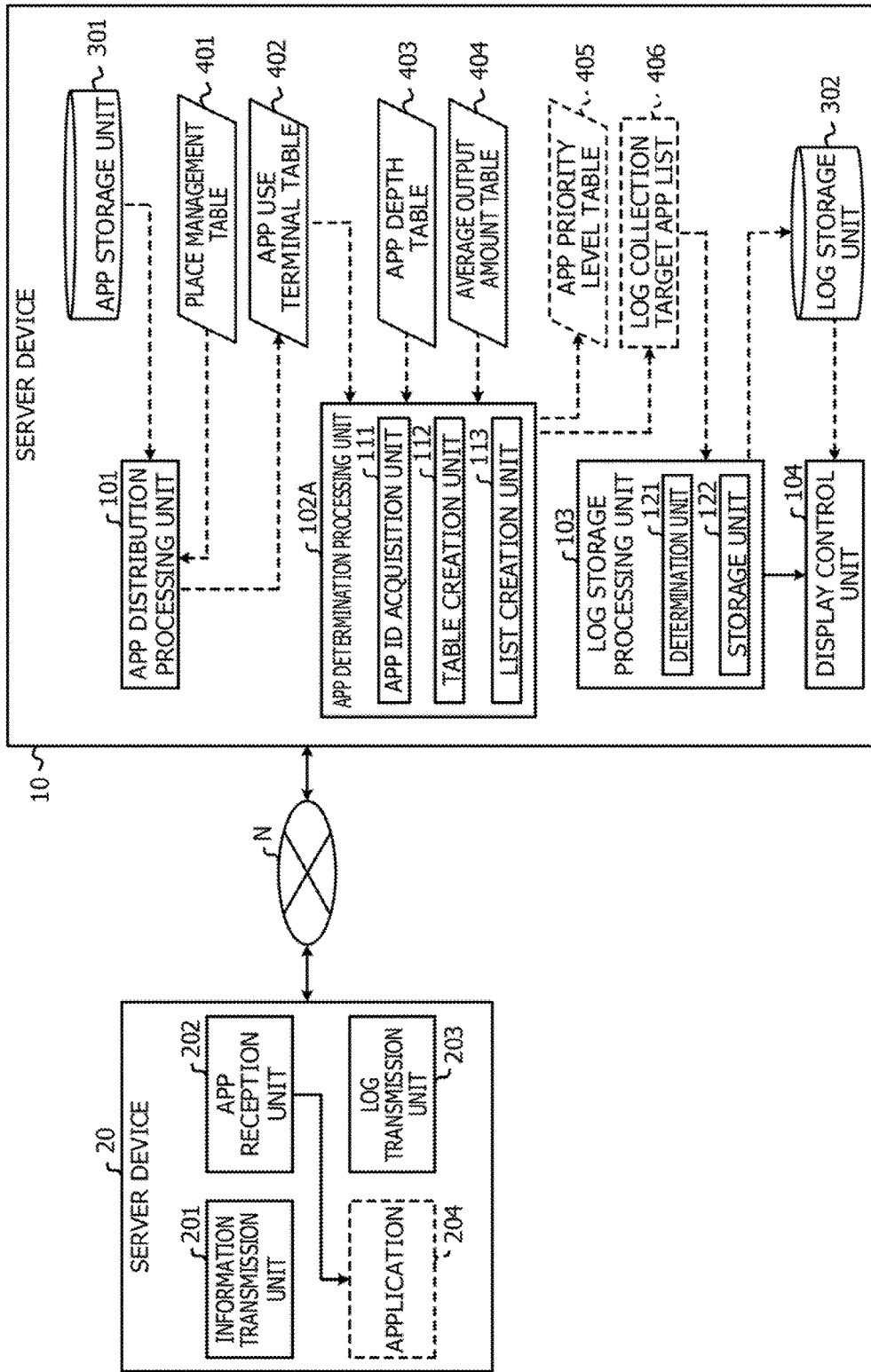
FIG. 4 is a diagram illustrating an example of a functional configuration of an app distribution system according to the first embodiment.

Next, a functional configuration of the app distribution system 1 according to this embodiment will be described with reference to FIG. 4. FIG. 4 is a diagram illustrating an example of a functional configuration of an app distribution system according to the first embodiment.

The server device 10 includes an app distribution processing unit 101, an app determination processing unit 102, a log storage processing unit 103, and a display control unit 104. Each of the functional units described above is realized by processing that one or more programs installed in the server device 10 cause the CPU 16 to execute.

Also, the server device 10 includes an app storage unit 301 and a log storage unit 302. Each of the storage units described above can be realized using the storage device 18. Note that the app storage unit 301 and/or the log storage unit 302 can be realized using a storage device, which is coupled to the server device 10 via the network N.

Furthermore, the server device 10 uses a place management table 401, an app use terminal table 402, an app depth table 403, an average output amount table 404, an app priority level table 405, and a log collection target app list 406. Each of the tables and the list described above is stored in the storage device 18.

When the app distribution processing unit 101 receives position information from the terminal devices 20, the app distribution processing unit 101 acquires an app assigned to a place including the position information from the app storage unit 301, based on the place management table 401. Then, the app distribution processing unit 101 transmits the acquired app to the terminal device 20. Thus, an app assigned to a place in which the terminal device 20 checked is distributed (push-distributed) to the terminal device 20.

Also, when the app distribution processing unit 101 distributes an app to the terminal device 20, the app distribution processing unit 101 stores a terminal ID that uniquely identifies the terminal device 20 in association with an app ID that uniquely identifies the app in the app use terminal table 402. Thus, the terminal device 20 that uses an app (that is, the terminal device 20 to which the app has been distributed) is managed.

The place management table 401 will be described below with reference to FIG. 5. FIG. 5 is a table illustrating an example of a place management table.

The place management table 401 illustrated in FIG. 5 includes, as items of data, a place ID, a place definition, a parent place ID, and an app ID. The place ID is identification information that uniquely identifies a place and is, for example, a name (a place name), which is given to the place.

The place definition is information used for defining a specific state that indicates a place and is, for example, information of a place represented by latitude and longitude ranges. Therefore, when the terminal device 20 enters a place represented by the latitude and longitude ranges, which is indicated by the place definition, the terminal device 20 checks in the place of a place ID associated with the place definition.

However, the place definition is not limited to what is described so far. A place definition may be, for example, identification information that identifies an access point of a wireless local area network (LAN), or identification information recorded in a near field communication (NFC) tag.

Note that, when the identification information of the access point of the wireless LAN is used as the place definition, a specific state by which a place can be defined, for example, as that the terminal device 20 entered a place in a range where the terminal device 20 is able to receive a radio wave sent from the access point of the wireless LAN. Also, when identification information recorded in the NFC tag is used as the place definition, a specific state that indicates a place can be defined, for example, as that the terminal device 20 entered a place (a space divided as a room) in which the NFC tag was installed.

The parent place ID is, the place ID of a parent place when there is a parent and child relation between places. As described above, the parent place ID is associated with the place ID, and thereby, the place ID forms a tree structure (which will be hereinafter also referred to a "tree structure" or a "hierarchical structure"). The app ID is identification information that identifies an app stored in the app storage unit 301.

As described above, in the place management table 401, the place definition, the parent place, and the app are associated with one another for each place. Thus, when the terminal device 20 checks in a place, the server device 10 can distribute an app assigned to the place to the terminal device 20. For example, when the terminal device 20 checked in "SCHOOL PLACE", the server device 10 can distribute "ATTENDANCE AND ABSENCE CHECKING APP" associated with "SCHOOL PLACE" to the terminal device 20.

Note that, in the place management table 401 illustrated in FIG. 5, app IDs "MUSIC TEXTBOOK APP" and "MUSIC PERFORMANCE APP" are associated with a place ID "MUSIC ROOM PLACE". As described above, multiple app IDs can be associated with a single place ID.

Also, the app use terminal table 402 will be described with reference to FIG. 6. FIG. 5 is a table illustrating an example of an app use, terminal table.

The app use terminal table 402 illustrated in FIG. 6 includes, as items of data, an app ID and a terminal ID. As described above, the app ID is identification information that uniquely identifies an app stored in the app storage unit 301. The terminal ID is, as described above, identification information that uniquely identifies the terminal device 20.

For example, in the app use terminal table 402 illustrated in FIG. 6, terminal IDs "TERMINAL 1", "TERMINAL 2", and "TERMINAL 3" are associated with the app ID "ATTENDANCE AND ABSENCE CHECKING APP".

As described above, in the app use terminal table 402, for each app, the terminal device 20 that uses the app is associated with the app. Thus, the server device 10 can manage the terminal device 20 that uses an app (that is, the terminal device 20 to which the app has been distributed).

The app determination processing unit 102 creates, based on the app use terminal table 402, the app depth table 403, and the average output amount table 404, the app priority level table 405 that manages the priority level of each app for which log information is collected. Then, the app determination processing unit 102 creates, based on the created app priority level table 405, the log collection target app list 406 that is a list of target apps for which the log information is collected.

The app depth table 403 will be described below with reference to FIG. 7. FIG. 7 is a table illustrating an example of an app depth table.

The app depth table 403 illustrated in FIG. 7 includes, as items of data, the app ID and the app depth. The app ID is, as described above, identification information that uniquely identifies an app stored in the app storage unit 301. The app depth is a depth in the tree structure of the place ID associated with the app ID in the place management table 401.

Figure 8:
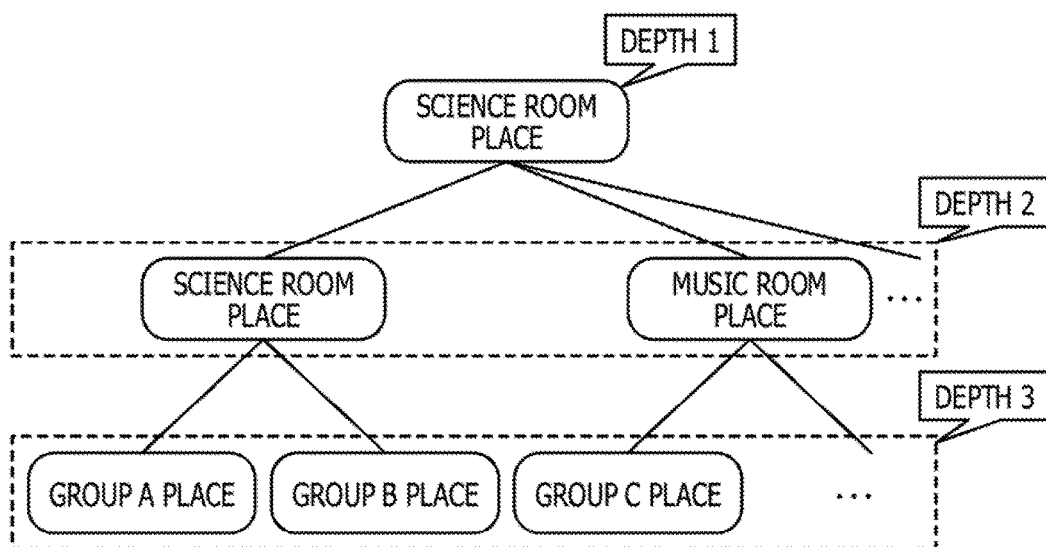
FIG. 8 is a diagram illustrating the depth of a place.

That is, each place managed by the place management table 401 illustrated in FIG. 5 forms the tree structure illustrated in FIG. 8. In this case, the depth of "SCHOOL PLACE" is "1", Similarly, each of the depths of "SCIENCE ROOM PLACE" and "MUSIC ROOM PLACE" is "2". Also, similarly, each of the depths of "GROUP A PLACE", "GROUP B PLACE", and "GROUP C PLACE" is "3".

Therefore, in the place management table 401, the app depth of "ATTENDANCE and ABSENCE CHECKING APP" associated with "SCHOOL PLACE" is "1". Similarly, each of the app depths of "SCIENCE TEXTBOOK APP", "MUSIC TEXTBOOK APP", and "MUSIC PERFORMANCE APP" is "2". Also, similarly, each of the app depths of "GROUP LEARNING APP" and "GROUP MUSIC PERFORMANCE APP" is "3".

As described above, in the app depth table 403, for each app, the app depth is associated with the app. Thus, the server device 10 can determine the priority level of each app, based on the app depth.

Note that, when, in the place management table 401, multiple place IDs are associated with a single app ID, the largest depth among the multiple place IDs can be the unique app depth.

Also, the average output amount table 404 will be described with reference to FIG. 9. FIG. 9 is a table illustrating an example of an average output amount table.

The average output amount table 404 illustrated in FIG. 9 include, as items of data, the app ID and the average log output amount. The app ID is, as described above, identification information that uniquely identifies an app stored in the app storage unit 301. The average log output amount is an output amount of log information that is output by an app in each unit time (for example, one hour).

As described above, in the average output amount table 404, for each app, the average log output amount of the app is associated with the app. Thus, the server device 10 can determine a target app whose log information should be collected in accordance with the priority level.

In this case, the app determination processing unit 102 includes an app ID acquisition unit 111, a table creation unit 112, and a list creation unit 113.

The app ID acquisition unit 111 acquires app IDs from the app depth table 403 in a descending order of the app depth. Also, the app ID acquisition unit 111 refers to the app use terminal table 402 and acquires, among the app IDs acquired from the app depth table 403, the app ID of an app that is used most by the terminal devices 20.

The table creation unit 112 refers to the app use terminal table 402 and stores the app ID acquired by the app ID acquisition unit 111 in association with the priority level in the app priority level table 405. Thus, the app priority level table 405 is created. Note that details of the app priority level table 405 are described later.

The list creation unit 113 creates, based on the app priority level table 405 created by the table creation unit 112 and the average output amount table 404, the log collection target app list 406. Note that details of the log collection target app list 406 will be described later.

The log storage processing unit 103 stores, based on the log collection target app list 406, the log information output from an app used by the terminal device 20 in the log storage unit 302.

In this case, the log storage processing unit 103 includes a determination unit 121 and a storage unit 122. The determination unit 121 refers to the log collection target app list 406 and determines whether or not the log information output from the app used by the terminal device 20 is log information output from an app that is a log information collection target. If it is determined by the determination unit 121 that the log information output from the app used by the terminal device 20 is log information output from an app that is a log information collection target, the storage unit 122 stores the log information in the log storage unit 302.

The display control unit 104 causes, for example, the display device 12 to display the log information stored in the log storage unit 302 by the log storage processing unit 103.

The app storage unit 301 stores an application that is distributed to the terminal device 20. The apps stored in the app storage unit 301 include, as described above, for example, various types of apps, such as "ATTENDANCE AND ABSENCE CHECKING APP", "SCIENCE TEXTBOOK APP", "MUSIC TEXTBOOK APP", "GROUP LEARNING APP", and so on.

The log storage unit 302 stores the log information of each of the various types of apps stored by the log storage processing unit 103. Note that the log information stored in the log storage unit 302 includes, for example, various types of log information, such as an operation log, an access log, a control log, and so on, of each app.

The terminal device 20 includes an information transmission unit 201, an app reception unit 202, and a log transmission unit 203. Each of the functional units described above is realized by processing that one or more programs installed in the terminal device 20 cause the CPU 16 to execute.

When the terminal device 20 checks in a place, the information transmission unit 201 transmits the position information of the terminal device 20 to the server device 10.

In response to check-in of the terminal device 20 in the place, the app reception unit 202 receives an app distributed from the server device 10. Thus, an application 204 distributed from the server device 10 is installed in the terminal device 20.

Note that, for example, if the terminal device 20 goes out of the place (the terminal device 20's going out of the place will be also referred to as "checking out"), the application 204 installed in the terminal device 20 is uninstalled.

The log transmission unit 203 transmits the log information output from the application 204 to the server device 10.

Figure 10:
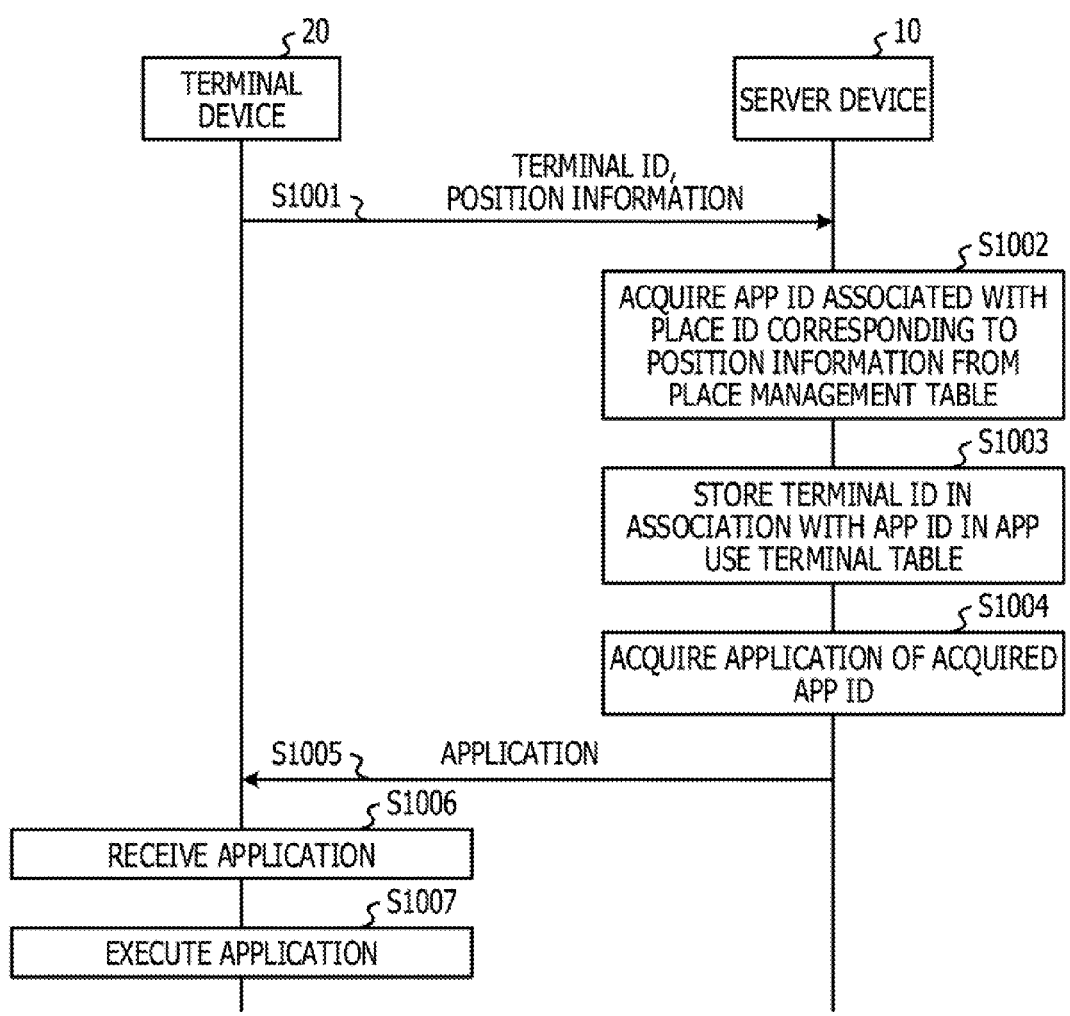
FIG. 10 is a sequence diagram illustrating an example of app distribution processing according to the first embodiment.

Next, details of processing of the app distribution system 1 according to this embodiment will be described. First, processing in which, when the terminal device 20 checks in a place, an app assigned to the place is distributed to the terminal device 20 from the server device 10 will be described with reference to FIG. 10. FIG. 10 is a sequence diagram illustrating an example of app distribution processing according to the first embodiment.

When the terminal device 20 checks in a place, the information transmission unit 201 of the terminal device 20 transmits the terminal ID and position information of the terminal device 20 to the server device 10 (Step S1001).

In this case, the information transmission unit 201 can transmit, as the position information, latitude and longitude information acquired by a GPS receiver to the server device 10. However, information that is transmitted as the position information by the information transmission unit 201 is not limited to what is described so far. The information transmission unit 201 may transmit, as the position information, a beacon ID acquired by the terminal device 20 from an access point of a wireless LAN or an ID recorded in the NFC tag acquired by the terminal device 20 from the NFC tag.

When the server device 10 receives the terminal ID and the position information from the terminal device 20, the app distribution processing unit 101 of the server device 10 acquires the app ID associated with the place ID corresponding to the position information from the place management table 401 (Step S1002).

That is, the app distribution processing unit 101 specifies the place ID corresponding to the place definition including the position information received from the terminal device 20. Then, the app distribution processing unit 101 acquires the app ID associated with the place ID from the place management table 401.

Next, the app distribution processing unit 101 of the server device 10 stores the terminal ID received from the terminal device 20 in association with the app ID acquired in Step S1002 in the app use terminal table 402 (Step S1003).

That is, the app distribution processing unit 101 adds the terminal ID received from the terminal device 20 in Step S1001 to the app ID acquired in Step S1002 in the app use terminal table 402.

Next, the app distribution processing unit 101 of the server device 10 acquires the app of the app ID acquired in Step S1002 from the app storage unit 301 (Step S1004).

Next, the app distribution processing unit 101 of the server device 10 transmits the acquired app to the terminal device 20 (Step S1005).

The app reception unit 202 of the terminal device 20 receives the app from the server device 10 (Step S1006). Thus, the app distributed from the server device 10 is installed in the terminal device 20.

Then, the application 204 of the terminal device 20 executes processing (Step S1007). Thus, a service that is realized by the application 204 is provided for the terminal device 20.

As described above, in the app distribution system 1 according to this embodiment, when the terminal device 20 checks in a place, an application assigned to the place is distributed to the terminal device 20 from the server device 10. Thus, in the app distribution system 1 according to this embodiment, a service related to the place can be provided for the terminal device 20.

Figure 11:
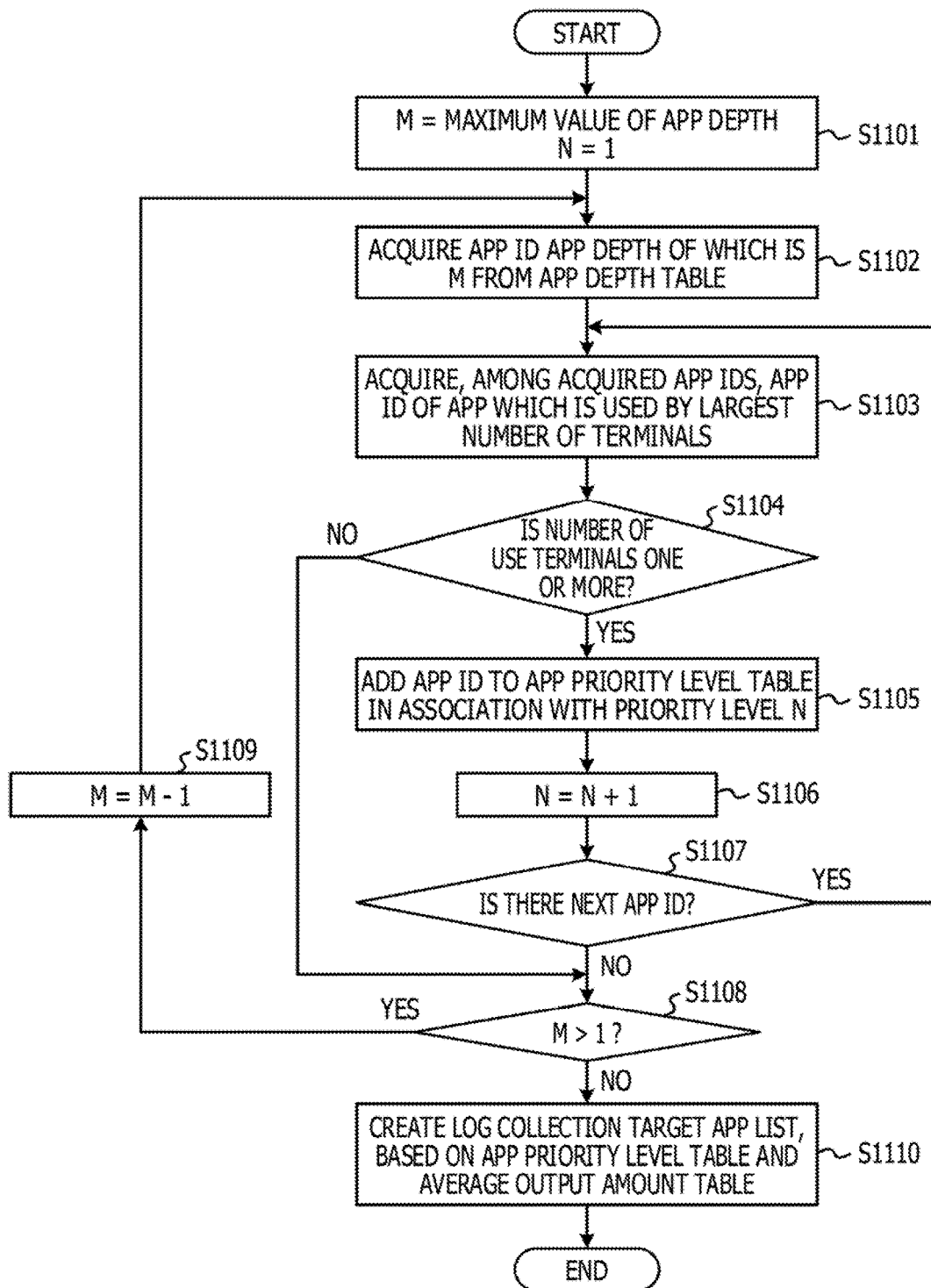
FIG. 11 is a flowchart illustrating an example of log collection target app list creation processing according to the first embodiment.

Next, processing in which an app that is a log information collection target among the apps installed in the terminal device 20 is determined will be described with reference to FIG. 11. FIG. 11 is a flowchart illustrating an example of log collection target app list creation processing according to the first embodiment.

The app determination processing unit 102 of the server device 10 sets, assuming that a variable that indicates an app depth is M, a maximum value of the app depth stored in the app depth table 403 as M. Also, assuming that the priority level of an app is N, the app determination processing unit 102 sets 1 as N (Step S1101).

That is, the app determination processing unit 102 sets the maximum value "3" of the app depth in the app depth table 403 illustrated in FIG. 7 as the app depth M and also sets "1" as the priority level "N".

Next, the app ID acquisition unit 111 of the server device 10 acquires the app ID the app depth of which is M from the app depth table 403 (Step S1102).

For example, if M=3, the app ID acquisition unit 111 acquires the app IDs "GROUP LEARNING APP" and "GROUP MUSIC PERFORMANCE APP" from the app depth table 403 illustrated in FIG. 7.

Similarly, for example, if M=2, the app ID acquisition unit 111 acquires the app IDs "SCIENCE TEXTBOOK APP", "MUSIC TEXTBOOK APP", AND "MUSIC PERFORMANCE APP" from the app depth table 403 illustrated in FIG. 7.

Next, the app ID acquisition unit 111 of the server device 10 refers to the app use terminal table 402 and acquires the app ID the number of app use terminals of which is the largest among the app IDs acquired from the app depth table 403 (Step S1103).

That is, the app ID acquisition unit 111 acquires the app ID associated with the largest number of app use terminal in the app use terminal table 402 among the app IDs acquired from the app depth table 403.

For example, when the app ID acquisition unit 111 acquires the app IDs "GROUP LEARNING APP" and "GROUP MUSIC PERFORMANCE APP" from the app depth table 403, the app ID acquisition unit 111 acquires the app ID "GROUP LEARNING APP" the number f app use terminals of which is the largest.

Similarly, for example, when the app ID acquisition unit 111 acquires the app IDs "SCIENCE TEXTBOOK APP", "MUSIC TEXTBOOK APP", AND "MUSIC PERFORMANCE APP" from the app depth table 403, the app ID acquisition unit 111 acquires the app ID "SCIENCE TEXTBOOK APP" the number of app use terminals of which is the largest.

Next, the table creation unit 112 of the app determination processing unit 102 refers to the app use terminal table 402 and determines whether or not the number of app use terminals of the app ID acquired in Step S1103 is one or more (Step S1104).

In Step S1104, if it is determined that the number of app use terminals is one or more, the table creation unit 112 adds the app ID acquired in Step S1103 to the app priority level table 405 in association with the priority level N (Step S1105).

On the other hand, in Step S1104, if it is determined that the number of app use terminals is not one or more (that is, the number of app use terminals is 0), the app determination processing unit 102 causes the process to proceed to Step S1108. That is, in this case, the app determination processing unit 102 reduces the value of the app depth M by one (that is, shallows the app depth M by one) and executes processing of Step S1102 and subsequent steps.

When the app ID is added to the app priority level table 405, the app determination processing unit 102 of the server device 10 reduces the priority level of each app by one (Step S1106). That is, the app determination processing unit 102 sets N+1 as the priority level N.

Next, the app ID acquisition unit 111 of the server device 10 determines whether or not there is a next app ID among the app IDs acquired from the app depth table 403 (Step S1107). That is, the app ID acquisition unit 111 determines whether or not there is any app ID that has not been acquired in Step S1103 among the app IDs acquired from the app depth table 403.

In Step S1107, if it is determined that there is not a next app ID, the app determination processing unit 102 determines whether or not the app depth M is larger than 1 (Step S1108).

On the other hand, in Step S1107, if it is determined that there is a next app ID, the app ID acquisition unit 111 causes the process to return to Step S1103. That is, in this case, the app ID acquisition unit 111 acquires the app ID the number of app use terminals of which is the next largest to the app ID acquired in Step S1103 described above among the app IDs acquired from the app depth table 403.

In Step S1108, if the app depth M is larger than 1, the app determination processing unit 102 deducts one from the value of the app depth M (Step S1109). That is, the app determination processing unit 102 sets M−1 as the app depth M. Thus, in the app determination processing unit 102, an app the app depth of which is one depth smaller is acquired in Step S1102, and processing of Step S1102 and subsequent steps are executed.

The processing of Step S1101 to Step S1109 described above is executed, and thereby, for example, the app priority level table 405 illustrated in FIG. 12 is created by the table creation unit 112 of the app determination processing unit 102. FIG. 12 is a table illustrating an example of an app priority level table.

The app priority level table 405 illustrated in FIG. 12 includes, as items of data, the priority level and the app ID. That is, in the app priority level table 405, for each priority level, an app ID is associated with the priority level. In this case, in the app priority level table 405 illustrated in FIG. 12, the app ID "GROUP LEARNING APP" of the priority level "1" has the highest priority level and, as the value of the priority level increases, the priority level of an app of the app ID associated with the priority level reduces.

Return to FIG. 11. In Step S1108, if the app depth M is one or less (that is, the app depth is 1), the list creation unit 113 creates, based on the app priority level table 405 and the average output amount table 404, the log collection target app list 406 (Step S1110).

In this case, the list creation unit 113 creates the log collection target app list 406, for example, in accordance with the priority level, such that the total of the average log output amounts of the apps is equal to or less than a predetermined threshold that has been determined in advance.

More specifically, assuming that the predetermined threshold is L, if $a_S+a_2+a_3 \leq L$ and $a_S+a_2+a_3+a_1 > L$ are satisfied, the list creation unit 113 creates the log collection target app list 406 including "GROUP LEARNING APP", "SCIENCE TEXTBOOK APP", AND "MUSIC TEXTBOOK APP".

That is, in a descending order of the priority level of the app ID, the list creation unit 113 adds the average log output amount of each app of the corresponding app ID. Then, when a result of the addition is a maximum value that does not exceed the predetermined threshold, the list creation unit 113 creates the log collection target app list 406 including the app ID associated with the average log output amount that has been added by then.

Figure 13:
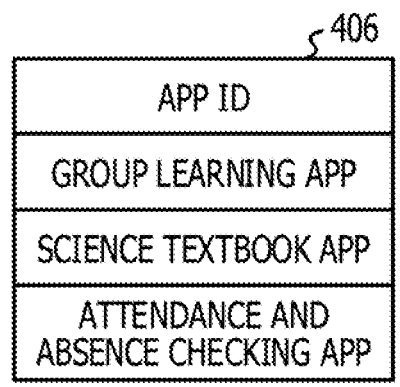
FIG. 13 is a table illustrating an example of a log collection target app list.

The log collection target app list 406 illustrated in FIG. 13 is created by the list creation unit 113. FIG. 13 is a table illustrating a log collection target app list.

The log collection target app list 406 illustrated in FIG. 13 includes, as an item of data, the app ID. That is, the log collection target app list 406 is a list of app IDs that are log information collection targets. Therefore, as will be described later, the server device 10 stores the log information output from the app of the app ID included in the log collection target app list 406 in the log storage unit 302.

Note that log collection target app list creation processing described above may be executed at a predetermined time (for example, every several hours to every several ten hours). Thus, the server device 10 can update the log collection target app list 406 at every predetermined time.

Figure 14:
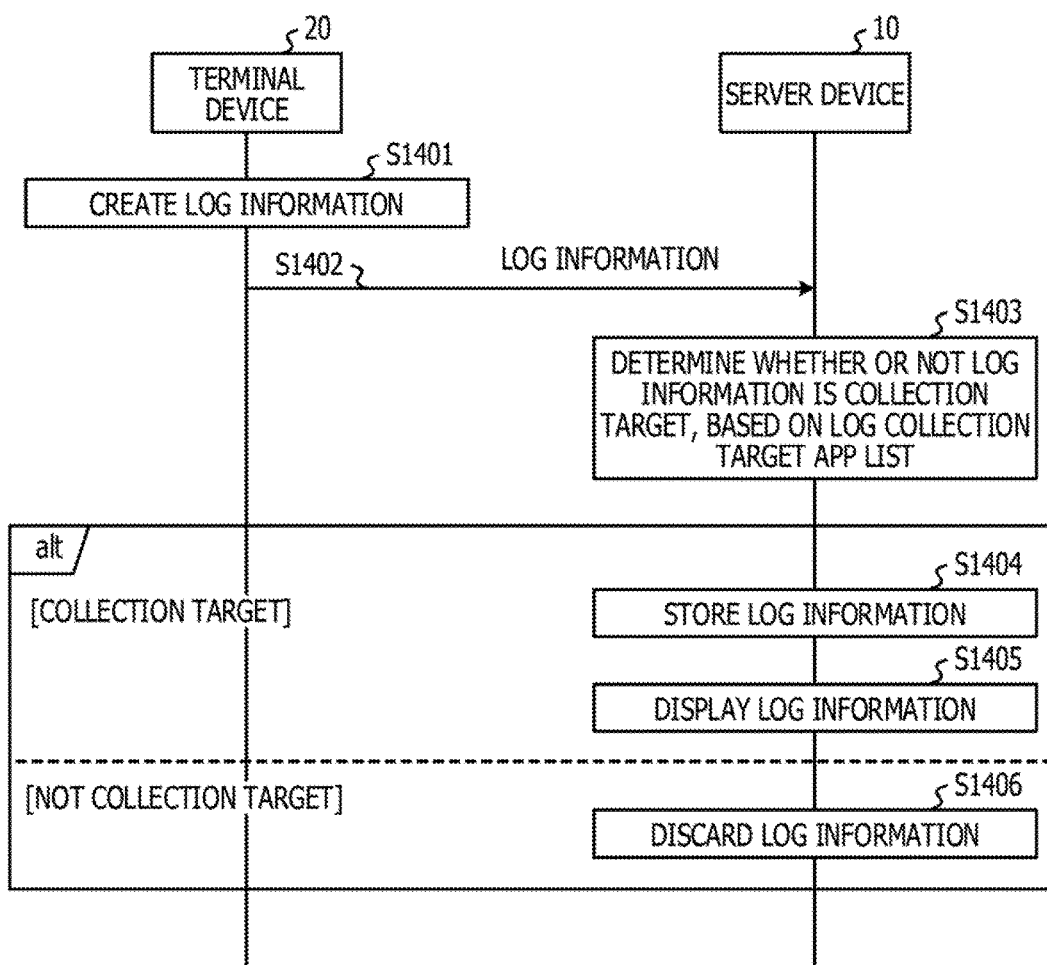
FIG. 14 is a sequence diagram illustrating an example of log information storage processing according to the first embodiment.

Next, processing in which the log information output from the app installed in the terminal device 20 is stored in the server device 10, based on the log collection target app list 406, will be described with reference to FIG. 14. FIG. 14 is a sequence diagram illustrating an example of log information storage processing according to the first embodiment.

The application 204 of the terminal device 20 creates log information, such as, for example, an operation log, an access log, a control log, and so on, in accordance with execution of the application 204 (Step S1401). Note that, in accordance with execution of the application 204, log information may be created by some other program than the application 204.

Next, the log transmission unit 203 of the terminal device 20 transmits the log information created by the application 204 to the server device 10 (Step S1402).

When the server device 10 receives the log information, the log storage processing unit 103 of the server device 10 determines, based on the log collection target app list 406, whether or not the log information is a collection target, by the determination unit 121 (Step S1403).

That is, the determination unit 121 determines, for the log information received from the terminal device 20, whether or not the app ID of the app that has output the log information is included in the log collection target app list 406.

In Step S1403, if it is determined that the log information is a collection target, the storage unit 122 of the log storage processing unit 103 stores the log information received from the terminal device 20 in the log storage unit 302 (Step S1404). Thus, the log information output from the app which is a log information collection target is collected.

Figure 15:
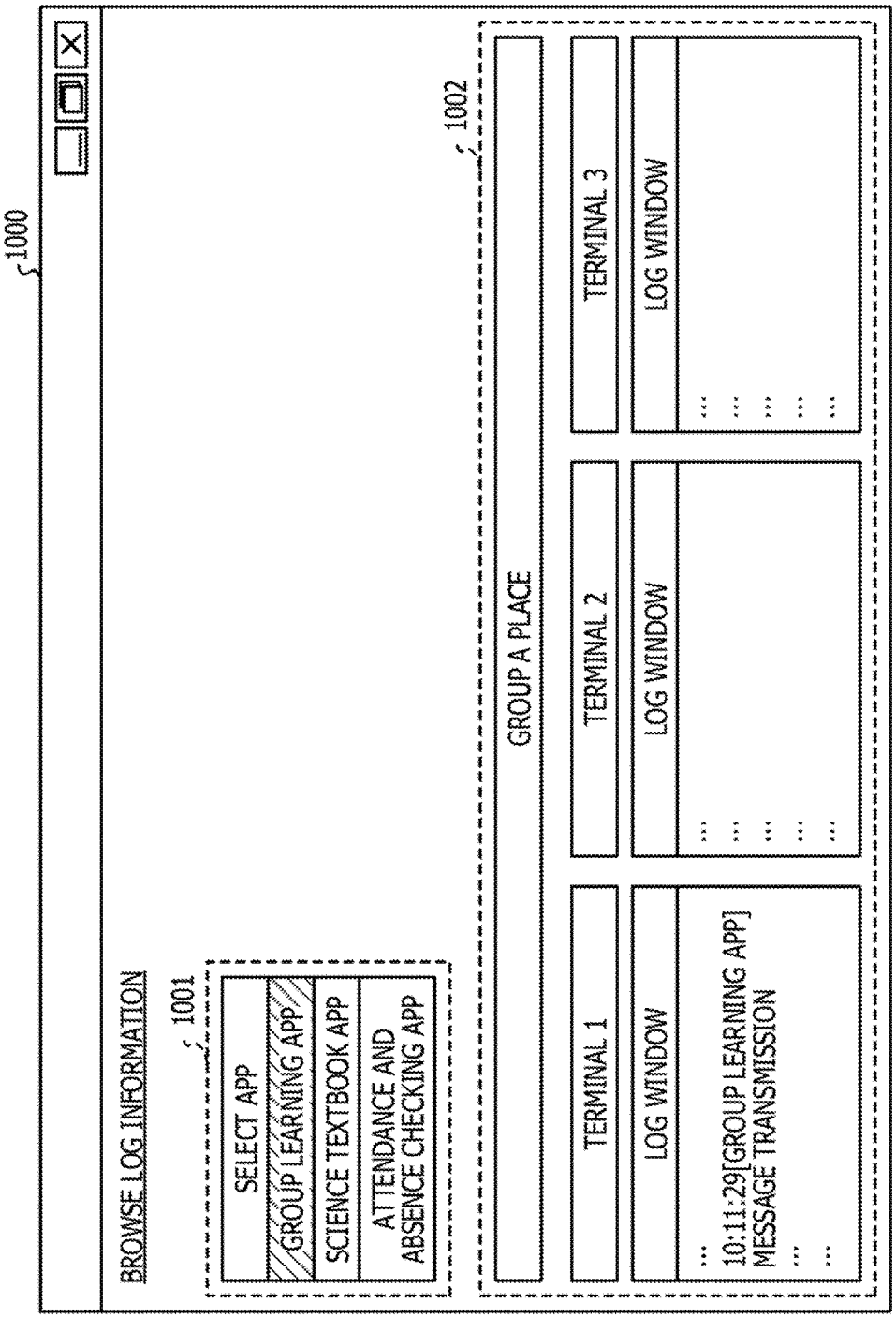
FIG. 15 is a diagram illustrating an example of a browsing screen of log information.

Also, when the storage unit 122 stores the log information in the log storage unit 302 the display control unit 104 of the server device 10 causes, for example, the display device 12 to display a log information browsing screen 1000 illustrated in FIG. 15 (Step S1405).

The log information browsing screen 1000 illustrated in FIG. 15 is a screen used for browsing the log information stored in the log storage unit 302. The log information browsing screen 1000 includes an app list 1001 used for selecting an app that is a log information browsing target and a log display field 1002 in which the log information is displayed for each terminal device 20. Thus, for example, a user, such as an administrator of the app distribution system 1, can browse the log information of an app on the app list 1001, which has been selected, in the log display field 1002 for each terminal device 20.

Thus, for example, the user, such as the administrator of the app distribution system 1, can preferentially browse the log information output by the service provided in the place. Therefore, in the app distribution system 1 according to this embodiment, the use status and the operation status of an application that is used for the service provided in the place can be grasped.

Note that, for example, in response to a request of an information processing device, such as a PC, which is coupled to the server device 10 via the network N, the information processing device may display the log information browsing screen 1000 illustrated in FIG. 15.

On the other hand, in Step S1403, if it is determined that the log information is not a collection target, the storage unit 122 of the log storage processing unit 103 discards the log information received from the terminal device 20 (Step S1406). As described above, the server device 10 discards the log information output from the app that is not a log information collection target. Thus, in the app distribution system 1 according to this embodiment, the log information stored in the log storage unit 302 can be reduced.

Second Embodiment

Next, a second embodiment will be described. In the second embodiment, whether or not log information is to be transmitted to the server device 10 is determined based on the log collection target app list 406 at the terminal device 20. Thus, in the app distribution system 1 according to the second embodiment, the communication amount of the network N can be reduced.

Note that, in the following description of the second embodiment, differences of the second embodiment from the first embodiment will be described, each part which has substantially the same function as that of the corresponding part of the first embodiment and each part which performs substantially the same processing as that of the corresponding part of the first embodiment will be denoted by the same reference numeral as that of the corresponding part of the first embodiment, and the description thereof will be omitted.

Figure 16:
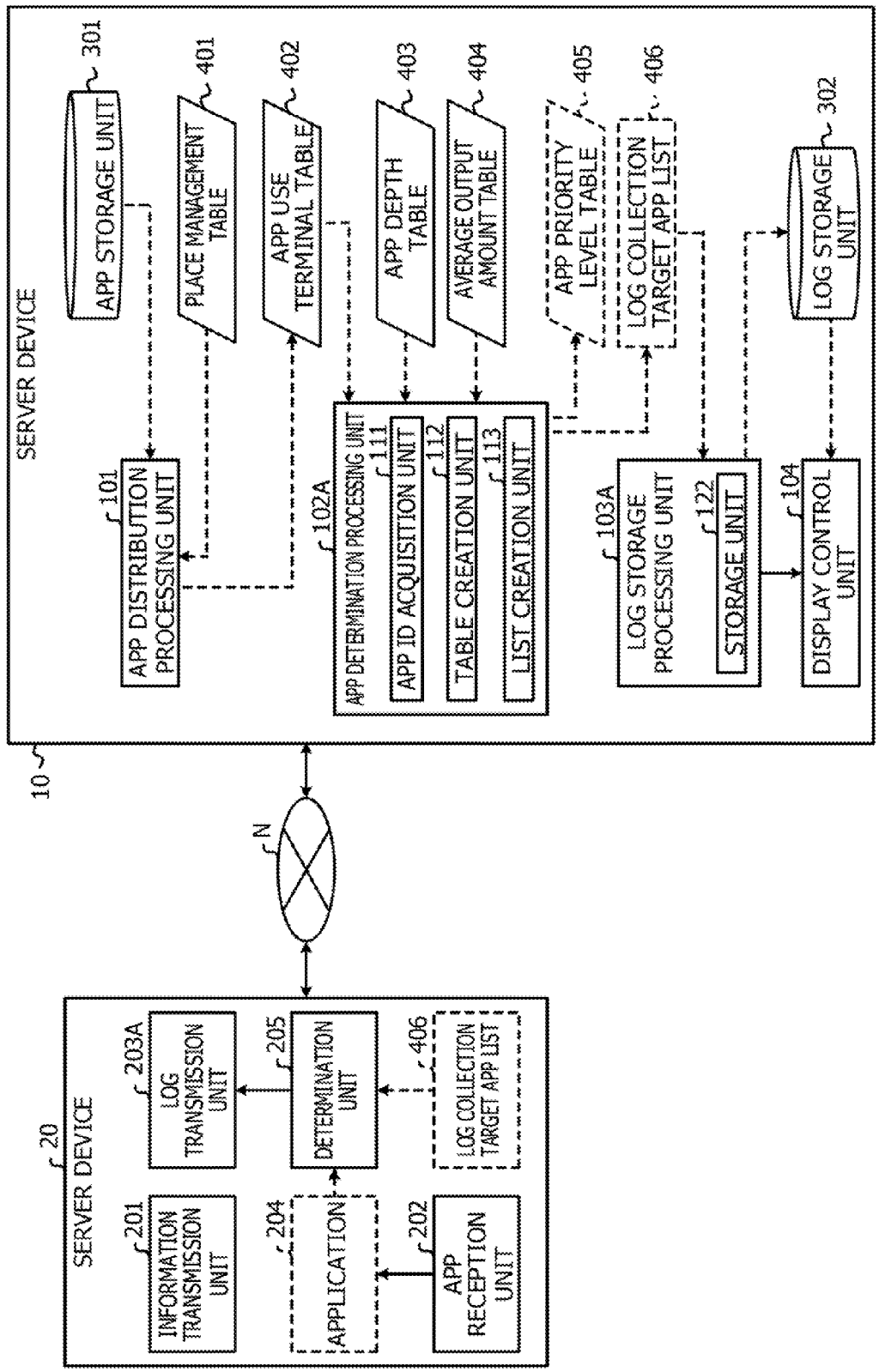
FIG. 16 is a diagram illustrating an example of a functional configuration of an app distribution system according to a second embodiment.

First, a functional configuration of the app distribution system 1 according to this embodiment will be described with reference to FIG. 16. FIG. 16 is a diagram illustrating an, example of a functional configuration of an app distribution system according to the second embodiment.

The server device 10 includes an app determination processing unit 102A and a log storage processing unit 103A. The app determination processing unit 102A transmits the log collection target app list 406 created by the list creation unit 113 to the terminal device 20. Also, the log storage processing unit 103A is different from the log storage processing unit 103 of the first embodiment in that the log storage processing unit 103A does not include the determination unit 121.

The terminal device 20 includes a log transmission unit 203A and a determination unit 205. Also, the terminal device 20 uses the log collection target app list 406. The log collection target app list 406 is stored, for example, in the storage device 18.

The determination unit 205 refers to the log collection target app list 406 received from the server device 10 and determines whether or not log information output from the application 204 is log information output from an app that is a log information collection target.

The log transmission unit 203A transmits the log information output from the application 204 to the server device 10 in accordance with a result of the determination of the determination unit 205. That is, if the log information output from the application 204 is the log information output from the app that is a log information collection target, the log transmission unit 203A transmits the log information to the server 10.

Figure 17:
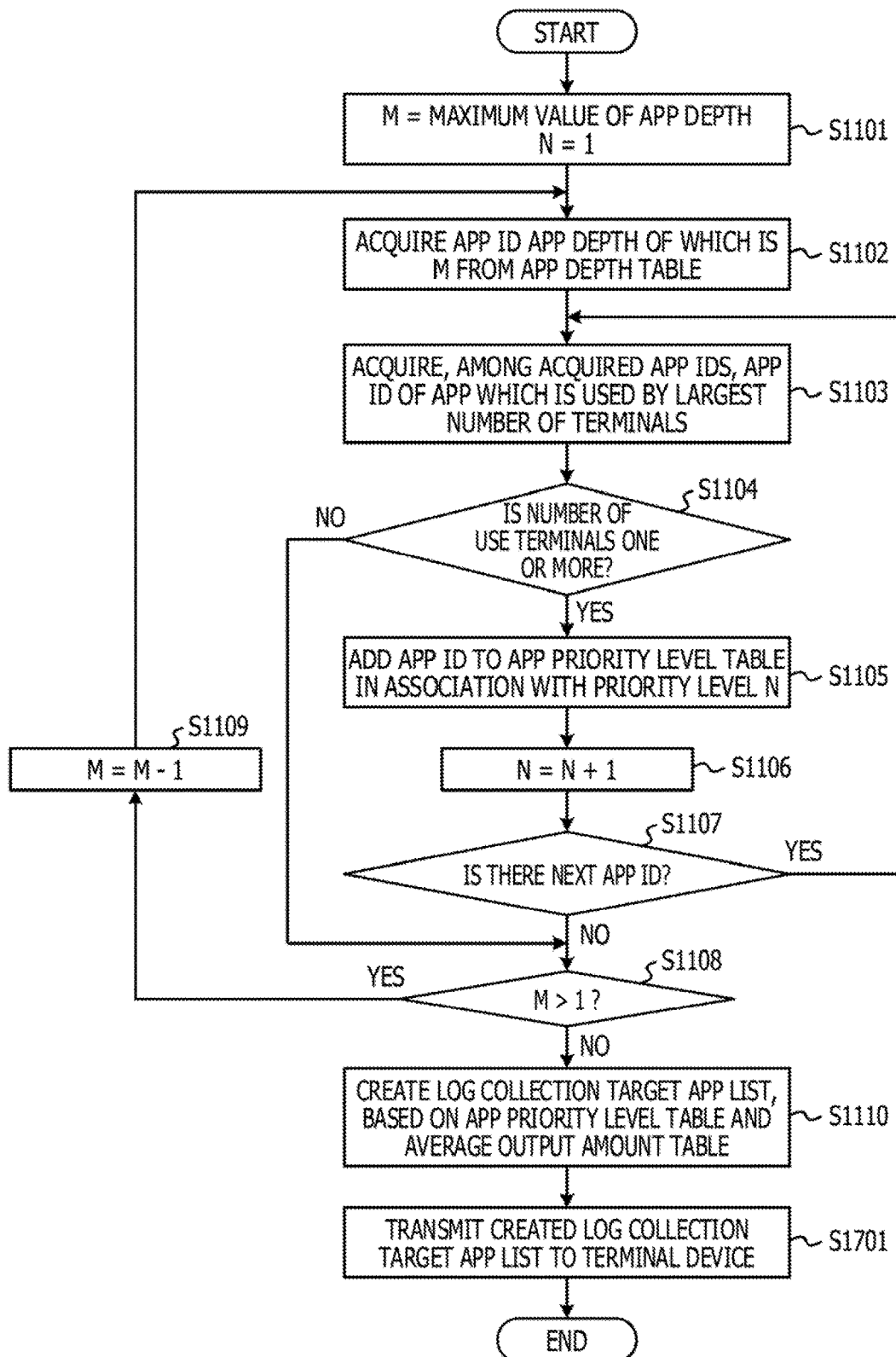
FIG. 17 is a flowchart illustrating an example of log collection target app list creation processing according to the second embodiment.

Next, details of processing of the app distribution system 1 according to this embodiment will be described. First, log collection target app list creation processing according to this embodiment will be described with reference to FIG. 17. FIG. 17 is a flowchart illustrating an example of log collection target app list creation processing according to the second embodiment. Note that processing of Step S1101 to Step S1110 is similar to that of the first embodiment, and the description thereof will be omitted.

The app determination processing unit 102A of the server device 10 transmits the log collection target app list 406 created by the list creation unit 113 to the terminal device 20 (Step S1701). Note that the app determination processing unit 102A has only to refer to, for example, the app use terminal table 402 and transmit the log collection target app list 406 to the terminal device 20 that uses at least one app.

Figure 18:
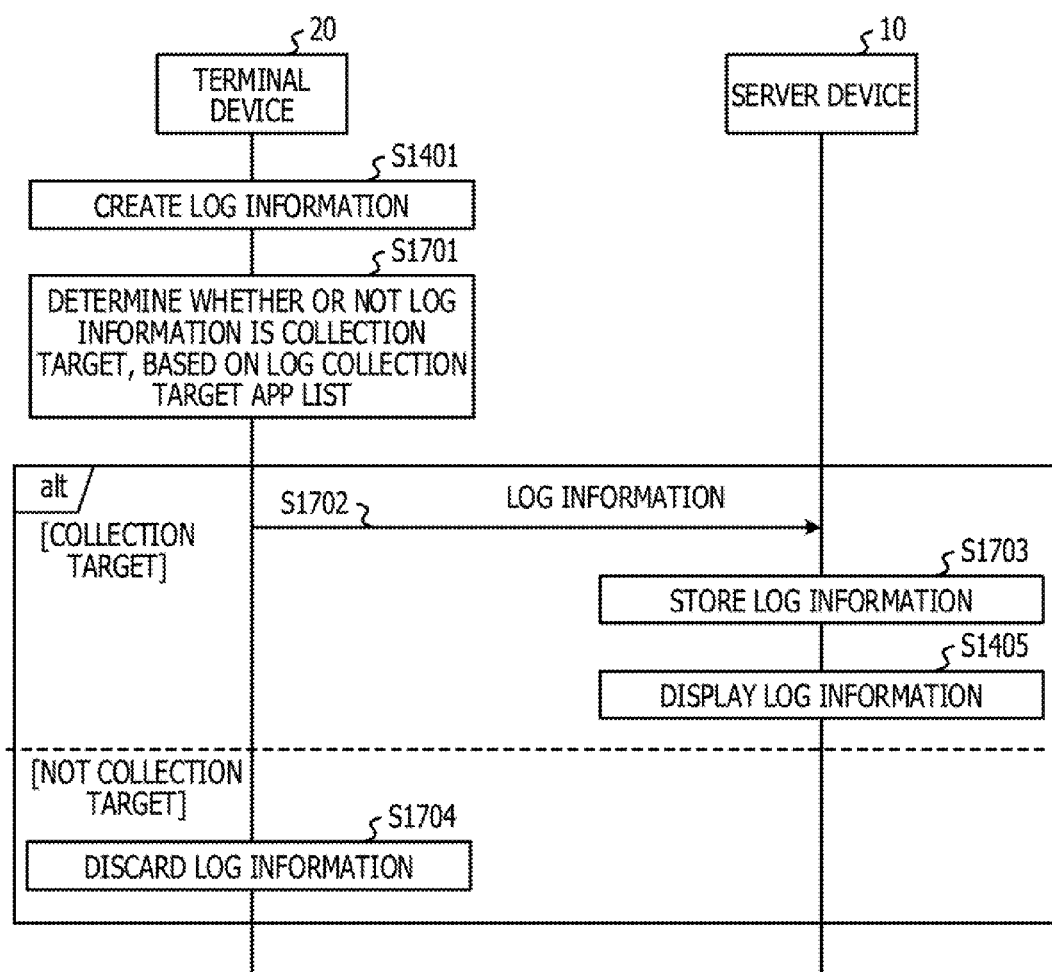
FIG. 18 is a sequence diagram illustrating an example of log information storage processing according to the second embodiment.

Next, log information storage processing according to this embodiment will be described with reference to FIG. 18. FIG. 18 is a sequence diagram illustrating an example of log information storage processing according to the second embodiment. Note that processing of Step S1401 and Step S1405 is similar to that of the first embodiment, and the description thereof will be omitted.

The determination unit 205 of the terminal device 20 determines, based on the log collection target app list 406, whether or not the log information created by the application 204 is a collection target (Step S1701).

That is, the determination unit 205 determines whether or not the app ID of the application 204 that has output the log information is included in the log collection target app list 406.

In Step S1701, if it is determined that the log information is a collection target, the log transmission unit 203A transmits the log information output from the application 204 to the server device 10 (Step S1702).

When the server device 10 receives the log information from the terminal device 20, the log storage processing unit 103A of the server device 10 stores the log information in the log storage unit 302 by the storage unit 122 (Step S1703).

On the other hand, in Step S1701, if it is determined that the log information is not a collection target, the log transmission unit 203A discards the log information output from the application 204 (Step S1704).

As described above, in the app distribution system 1 according to this embodiment, whether or not the log information is to be transmitted to the server device 10 is determined based on the log collection target app list 406 at the terminal device 20. Thus, in the app distribution system 1 according to this embodiment, the amount of communication between the server device 10 and the terminal device 20 can be reduced.

Third Embodiment

Next, a third embodiment will be described. In the third embodiment, log information of a module that has a dependency relation with an app that is a log information collection target is also collected. The term "module" herein is a program that operates on the server device 10 and provides a predetermined function (for example, each of various types of functions, such as an application server function, a file sharing function, and so on).

Note that, in the following description of the third embodiment, differences of the third embodiment from the first embodiment will be described, each part which has substantially the same function as that of the corresponding part of the first embodiment and each part which performs substantially the same processing as that of the corresponding part of the first embodiment will be denoted by the same reference numeral as that of the corresponding part of the first embodiment, and the description thereof will be omitted.

Figure 19:
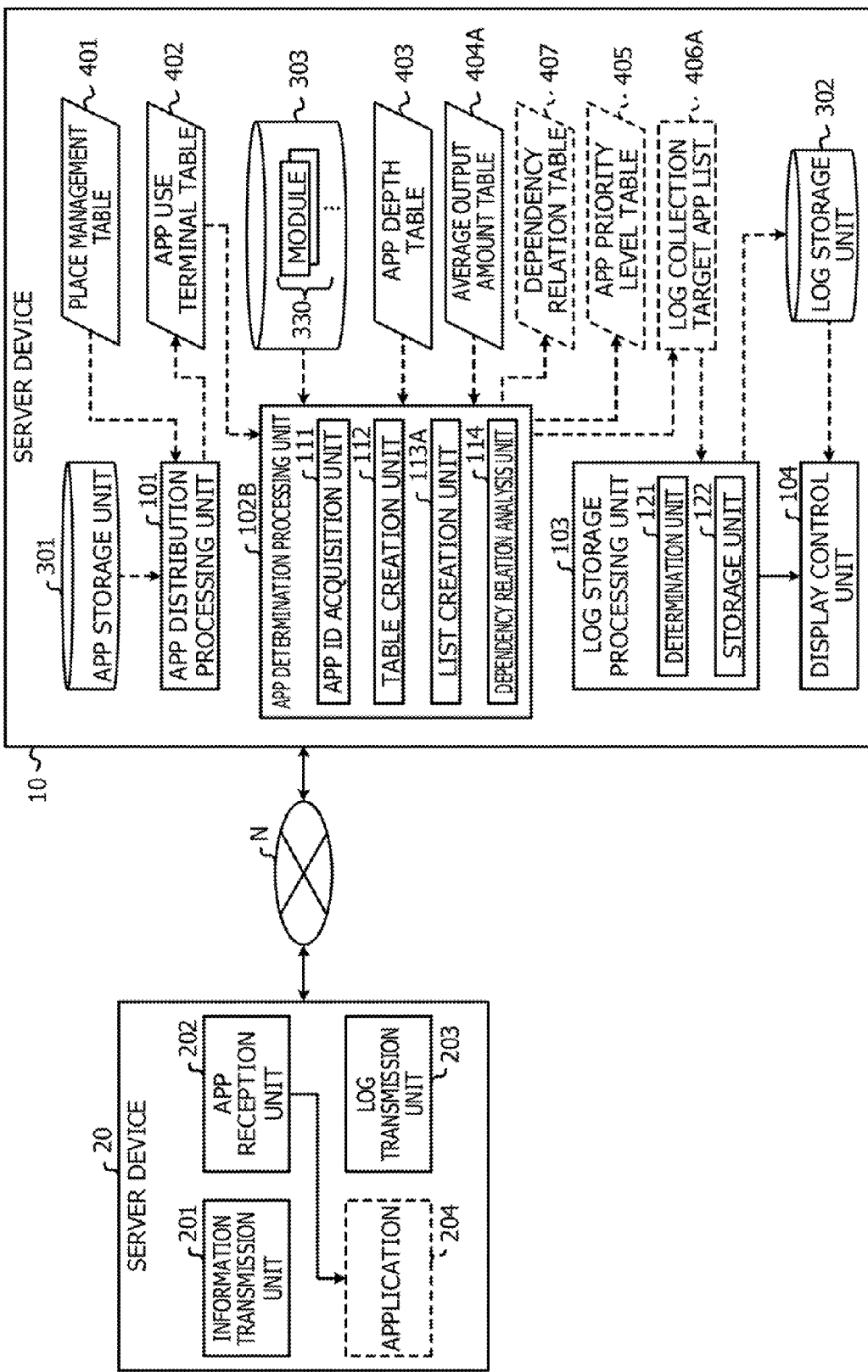
FIG. 19 is a diagram illustrating an example of a functional configuration of an app distribution system according to a third embodiment.

First, a functional configuration of the app distribution system 1 according to this embodiment will be described with reference to FIG. 19. FIG. 19 is a diagram illustrating an example of a functional configuration of an app distribution system according to a third embodiment.

The server device 10 includes an app determination processing unit 1028. The app determination processing unit 1028 is different from the app determination processing unit 102 of the first embodiment in that the app determination processing unit 1028 includes a dependency relation analysis unit 114 and a list creation unit 113A.

Also, the server device 10 includes a module storage unit 303. The storage unit can be realized using the storage device 18. Note that the storage unit can be realized using a storage device, which is coupled to the server device 10 via the network N.

Furthermore, the server device 10 uses an average output amount table 404A, a log collection target app list 406A, and a dependency relation table 407. The tables and the list described above are stored in the storage device 18.

The dependency relation analysis unit 114 analyzes a dependency relation between an app stored in the app storage unit 301 and a module stored in the module storage unit 303 and creates the dependency relation table 407. A case where there is a dependency relation between the app and the module herein is, for example, a case where there is a relation in which the app calls the module, a case where there is a relation in which the app is called by the module. Note that details of the dependency relation table 407 will be described later.

The list creation unit 113A creates, based on the app priority level table 405, the average output amount table 404A, and the dependency relation table 407, the log collection target app list 406A.

The average output amount table 404A will be described below with reference to FIG. 20. FIG. 20 is a table illustrating another example of the average output amount table.

The average output amount table 404A illustrated in FIG. 20 includes, as an item of data, instead of the app ID, another app ID (a module ID). The app ID (the module ID) is identification information that uniquely identifies an app or identification information that uniquely identifies a module. Thus, in the average output amount table 404A, in addition to the average log output amount for each app, an average log output amount for each module is managed.

For example, in the average output amount table 404A illustrated in FIG. 20, the average log output amounts "$b_1$", "$b_2$", and "$b_3$" are associated with "MODULE 1", "MODULE 2", and "MODULE 3", respectively.

The module storage unit 303 operates on the server device 10 and stores a module that provides a predetermined function for the terminal device 20. Modules stored in the module storage unit 303 include various types of modules such as, for example, "MODULE 1" that provides an application server function, "MODULE 2" that provides a file sharing function, and so on.

Figure 21:
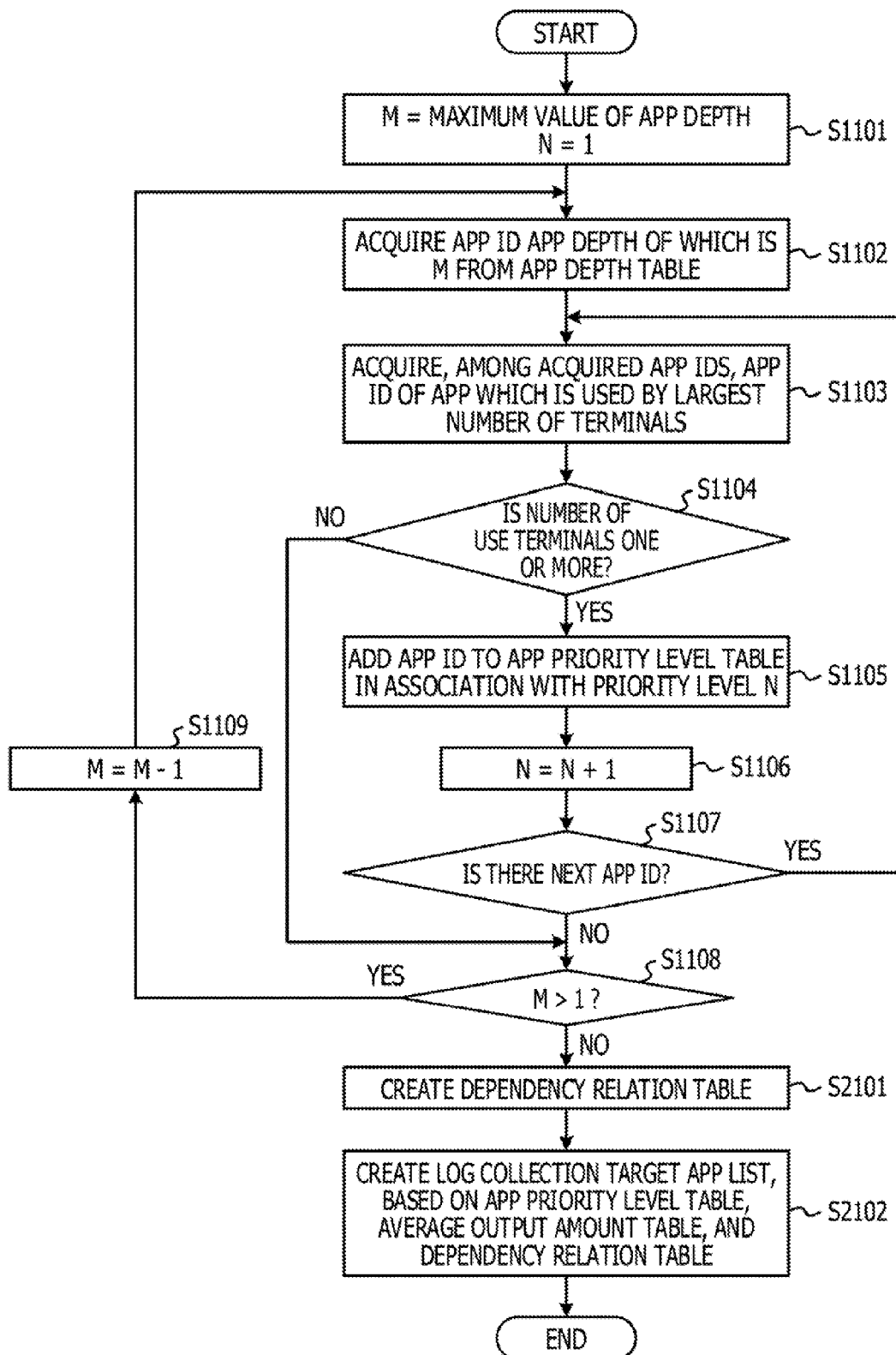
FIG. 21 is a flowchart illustrating an example of log collection target app list creation processing according to the third embodiment.

Next, details of processing of the app distribution system 1 according to this embodiment will be described. In the following description, log collection target app list creation processing according to this embodiment will be described with reference to FIG. 21. FIG. 21 is a flowchart illustrating an example of log collection target app list creation processing according to the third embodiment. Note that processing of Step S1101 to Step S1109 is similar to that of the first embodiment, and therefore, the description thereof will be omitted.

In Step S1108, if the app depth M is one or less, the dependency relation analysis unit 114 analyzes the dependency relation between the app and the module and creates the dependency relation table 407 (Step S2101).

The dependency relation table 407 created by the dependency relation analysis unit 114 will be described below with reference to FIG. 22. FIG. 22 is a table illustrating an example of a dependency relation table.

The dependency relation table 407 illustrated in FIG. 22 includes, as items of data, an app ID and a dependency module ID. That is, in the dependency relation table 407, for each app ID, the module ID of a module that has a dependency relation with the app ID is associated with the app ID.

For example, the module IDs "MODULE 1" and "MODULE 2" are associated with the app ID "GROUP LEARNED APP". Thus, "GROUP LEARNING APP", "MODULE 1", "GROUP LEARNING APP", and "MODULE 2" are managed such that "GROUP LEARNING APP" and "MODULE 1" have a dependency relation and "GROUP LEARNING APP" and "MODULE 2" have a dependency relation.

Note that, in the dependency relation table 407 illustrated in FIG. 22, while the module ID that has a dependency relation with the app ID is associated with the app ID, the dependency relation is not limited between the app and the module that has the relation with the app; another app ID that has a dependency relation with the app ID may be associated with the app ID. Thus, another app that has a dependency relation with the app can be managed.

Also, for example, the module ID of a module that has a dependency relation with an app with the highest frequency of use in the app priority level table 405 created in Step S1105 may be stored in the dependency relation table 407. Thus, the module that has a dependency relation with the app with the high frequency of use in the terminal device 20 can be managed, Return to FIG. 21. The list creation unit 113A creates, based on the app priority level table 405, the average output amount table 404A, and the dependency relation table 407, the log collection target app list 406A (Step S2102).

In this case, the list creation unit 113A creates, in accordance with the priority level, the log collection target app list 406A, for example, such that the total of the average log output amount of an app and the average log output amount of a module that has a dependency relation with the app is equal to or less than a predetermined threshold that has been determined in advance.

More specifically, assuming that the predetermined threshold is L, if $a_S+b_1+b_2+a_2+b_3 \leq L$ and $a_S+b_1+b_2+a_2+b_3+a_3 > L$ are satisfied, the list creation unit 113A creates the log collection target app list 406A including "GROUP LEARNING APP", "MODULE 1", "MODULE 2", "SCIENCE TEXTBOOK APP", AND "MODULE 3".

That is, in a descending order of the priority level of the app ID, the list creation unit 113A adds the average log output amount of each app of the corresponding app ID and the average log output amount of a module that has a dependency relation with the app. Then, when a result of the addition is a maximum value that is not exceed the predetermined threshold, the list creation unit 113A creates the log collection target app list 406A including the app IDs and the module IDs associated with the average log output amounts that have been added by then.

Figure 23:
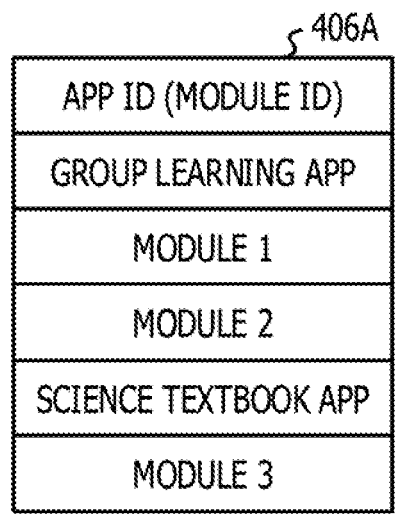
FIG. 23 is a table illustrating another example of the log collection target app list.

The log collection target app list 406A in FIG. 23 is created by the list creation unit 113A. FIG. 23 is a table illustrating another example of the log collection target app list.

The log collection target app list 406A illustrated in FIG. 23 includes not only an app ID, but also a module ID. That is, the log collection target app list 406A is a list of app IDs and module IDs, which can be log collection targets. Accordingly, the server device 10 stores log information output from each of the apps of the app IDs included in the log collection target app list 406A and the modules of the module IDs included in the log collection target app list 406A in the log storage unit 302.

Note that a method for crewing the log collection target app list 406A is not limited to what is described so far. The list creation unit 113A may create the log collection target app list 406A, for example, in the following manner.

That is, the list creation unit 113A first creates the log collection target app list 406A in accordance with the method described in the first embodiment. Next, if the total of the average log output amounts of the apps of the apps ID included in the log collection target app list 406A is equal to or less than the predetermined threshold, the list creation unit 113A adds the average log output amounts of modules that have a dependency relation with the apps of the apps ID to the total. Then, if a result of the addition is a maximum value that does not exceed the predetermined threshold, the list creation unit 113A adds the module IDs associated with the average log output amounts that have been added by then to the log collection target app list 406A.

As described above, in the app distribution system 1 according to this embodiment, in accordance with the priority level of an app, the log information of a module that has a dependency relation with the app is also collected. Thus, in the app distribution system 1 according to this embodiment, operation information of the module that has a dependency relation with a high priority app can be grasped.

Although the first, second, and third embodiments have been described in detailed above, the present disclosure is not limited to specific embodiments and various modifications and changes may be made to those embodiments without departing from the scope of the gist of the present disclosure as set forth in the claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made, hereto without departing from the spirit and scope of the invention.

What is claimed is:

1. An information processing device comprising:
a memory; and
a processor coupled to the memory and the processor configured to:
determine, in accordance with a first depth corresponding to a first condition associated with an application in a hierarchical structure, a priority level of the application that provides a service based on the first condition included in a plurality of conditions, each condition of the plurality of conditions corresponding to each depth in the hierarchical structure,
perform, in accordance with the priority level of the application, determination whether the application is a collection target, and
when the application is the collection target, collect a log of the application from a terminal which has downloaded the application.

2. The information processing device according to claim 1, wherein the processor is further configured to:
specify a module depending on the application on the basis of a dependency relation information among applications and modules; and
collect a log of the module when the application is the collection target.

3. The information processing device according to claim 1, wherein the application is downloaded by the terminal in accordance with a position of the terminal and the position is determined on the basis of wireless communication between the terminal and an apparatus installed in a place relating to the first condition.

4. The information processing device according to claim 1, wherein the determination is performed in accordance with a predicted amount of logs to be stored in the memory.

5. An information processing method for processing information in an information processing device, the method comprising:
determining, in accordance with a first depth corresponding to a first condition associated with an application in a hierarchical structure, a priority level of the application that provides a service based on the first condition included in a plurality of conditions, each condition of the plurality of conditions corresponding to each depth in the hierarchical structure;
performing, in accordance with the priority level of the application, determination whether the application is a collection target; and
when the application is the collection target, collecting a log of the application from a terminal which has downloaded the application.

6. The information processing method according to claim 5, further comprising:
specifying a module depending on the application on the basis of a dependency relation information among applications and modules; and
collecting a log of the module when the application is the collection target.

7. The information processing method according to claim 5, wherein the application is downloaded by the terminal in accordance with a position of the terminal and the position is determined on the basis of wireless communication between the terminal and an apparatus installed in a place relating to the first condition.

8. The information processing method according to claim 5,
wherein the determination is performed in accordance with a predicted amount of logs to be stored in the memory.

* * * * *